(12) United States Patent
Dollar et al.

(10) Patent No.: US 9,934,577 B2
(45) Date of Patent: Apr. 3, 2018

(54) DIGITAL IMAGE EDGE DETECTION

(71) Applicant: MICROSOFT TECHNOLOGY LICENSING, LLC, Redmond, WA (US)

(72) Inventors: Piotr Dollar, Redmond, WA (US); Charles Lawrence Zitnick, III, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 87 days.

(21) Appl. No.: 14/328,506

(22) Filed: Jul. 10, 2014

(65) Prior Publication Data

US 2015/0206319 A1  Jul. 23, 2015

Related U.S. Application Data

(60) Provisional application No. 61/928,944, filed on Jan. 17, 2014.

(51) Int. Cl.
| | |
|---|---|
| *G06K 9/46* | (2006.01) |
| *G06T 7/00* | (2017.01) |
| *G06K 9/62* | (2006.01) |
| *G06T 7/13* | (2017.01) |

(52) U.S. Cl.
CPC .......... *G06T 7/0085* (2013.01); *G06K 9/4604* (2013.01); *G06K 9/6296* (2013.01); *G06T 7/13* (2017.01); *G06T 2207/20081* (2013.01)

(58) Field of Classification Search
CPC . G06T 2207/20016; G06T 2207/20192; G06T 5/002; G06T 7/0083; G06K 9/6293; G06K 9/626; G06K 9/6219

USPC ......................................................... 382/159
See application file for complete search history.

(56) References Cited

U.S. PATENT DOCUMENTS

| | | | |
|---|---|---|---|
| 6,507,675 B1 | 1/2003 | Lee et al. | |
| 7,076,093 B2 | 7/2006 | Lee et al. | |
| 7,738,705 B2 | 6/2010 | Casadei | |
| 7,805,003 B1 * | 9/2010 | Cohen | G06K 9/00463 382/103 |
| 9,105,088 B1 * | 8/2015 | Petrie | G06T 5/002 |
| 2002/0044689 A1 | 4/2002 | Roustaei et al. | |
| 2003/0081854 A1 * | 5/2003 | Deshpande | H04N 5/208 382/261 |
| 2003/0128280 A1 * | 7/2003 | Perlmutter | G06K 9/32 348/222.1 |
| 2008/0226175 A1 * | 9/2008 | Suzuki | G06K 9/00268 382/190 |

(Continued)

OTHER PUBLICATIONS

Chung-Bin Wu, Bin-Da Liu, , and Jar-Ferr Yang, "Adaptive Post-processors With DCT-Based Block Classifications";IEEE 2003.*

(Continued)

*Primary Examiner* — Stephen R Koziol
*Assistant Examiner* — Shaghayegh Azima
(74) *Attorney, Agent, or Firm* — Alleman Hall Creasman & Tuttle LLP

(57) ABSTRACT

Edges are detected in a digital image including a plurality of pixels. For each of the plurality of pixels, a plurality of different edge assessments are made for that pixel. Each different edge assessment considers that pixel in a different position of a different pixel patch. The different edge assessments for each pixel are aggregated.

20 Claims, 4 Drawing Sheets

(56) References Cited

U.S. PATENT DOCUMENTS

| | | | | |
|---|---|---|---|---|
| 2009/0245657 | A1* | 10/2009 | Osugi | G06K 9/00791 382/209 |
| 2009/0327386 | A1* | 12/2009 | Schoenblum | G06T 5/002 708/400 |
| 2010/0104202 | A1* | 4/2010 | Chen | H04N 5/21 382/218 |
| 2010/0111400 | A1* | 5/2010 | Ramirez | G01N 15/1031 382/134 |
| 2010/0266175 | A1 | 10/2010 | Seung et al. | |
| 2011/0081087 | A1* | 4/2011 | Moore | G06K 9/00711 382/199 |
| 2012/0114235 | A1* | 5/2012 | Lam | G06T 5/50 382/167 |
| 2012/0148162 | A1* | 6/2012 | Zhang | G06T 7/11 382/195 |
| 2012/0207359 | A1* | 8/2012 | Konukoglu | G06K 9/6277 382/128 |
| 2012/0239174 | A1* | 9/2012 | Shotton | G06F 3/017 700/93 |
| 2012/0300982 | A1* | 11/2012 | Tanase | G06K 9/00684 382/103 |
| 2013/0129225 | A1* | 5/2013 | Poyil | G06T 7/0085 382/199 |
| 2013/0343619 | A1* | 12/2013 | Criminisi | G06K 9/6219 382/128 |
| 2014/0270489 | A1* | 9/2014 | Lim | G06K 9/4604 382/159 |
| 2015/0055875 | A1* | 2/2015 | Kawaguchi | G06K 9/4638 382/199 |
| 2015/0199592 | A1* | 7/2015 | Kim | G06K 9/6267 382/202 |
| 2015/0199818 | A1* | 7/2015 | Einecke | G06K 9/00791 382/104 |
| 2016/0132995 | A1* | 5/2016 | Lin | G06K 9/46 382/203 |

OTHER PUBLICATIONS

Payet, N. et al., "SLEDGE: Sequential Labeling of Image Edges for Boundary Detection," International Journal of Computer Vision, vol. 104, No. 1, pp. 15-37, Aug. 2013, 22 pages.

Arbelaez, P. et al., "Contour Detection and Hierarchical Image Segmentation," IEEE Transactions on Pattern Analysis and Machine Intelligence, vol. 33, No. 5, pp. 898-916, May 2011, 20 pages.

Blaschko, M. et al., "Learning to Localize Objects with Structured Output Regression," Proceedings of the 10th European Conference on Computer Vision: Part I, pp. 2-15, Oct. 2008, 14 pages.

Bowyer, K. et al., "Edge Detector Evaluation Using Empirical ROC Curves," Proceedings of IEEE Computer Society Conference on Computer Vision and Pattern Recognition, Jun. 1999, 46 pages.

Canny, J., "A Computational Approach to Edge Detection," IEEE Transactions on Pattern Analysis and Machine Intelligence ,vol. PAMI-8, No. 6, pp. 679-698, Nov. 1986, 20 pages.

Catanzaro, B. et al., "Efficient, High-Quality Image Contour Detection," Proceedings of IEEE 12th International Conference on Computer Vision, pp. 2381-2388, Sep. 2009, 8 pages.

Criminisi, A. et al., "Decision Forests: A Unified Framework for Classification, Regression, Density Estimation, Manifold Learning and Semi-Supervised Learning," Foundations and Trends® in Computer Graphics and Vision, vol. 7, No. 2-3, pp. 81-227, Mar. 2012, 150 pages.

Dollar, P. et al., "The Fastest Pedestrian Detector in the West," Proceedings of the British Machine Vision Conference, pp. 68.1-68.11, Sep. 2010, 11 pages.

Dollar, P. et al., "Supervised Learning of Edges and Object Boundaries," Proceedings of the IEEE Computer Society Conference on Computer Vision and Pattern Recognition, vol. 2, pp. 1964-1971, Jun. 2006, 8 pages.

Felzenszwalb, P. et al., "Efficient Graph-Based Image Segmentation," International Journal of Computer Vision, vol. 59, No. 2, pp. 167-181, Sep. 2004, 16 pages.

Ferrari, V. et al., "Groups of Adjacent Contour Segments for Object Detection," IEEE Transactions on Pattern Analysis and Machine Intelligence, vol. 30, No. 1, pp. 36-51, Jan. 2008, 16 pages.

Fram, J. et al., "On the Quantitative Evaluation of Edge Detection Schemes and their Comparison with Human Performance," IEEE Transactions on Computers, vol. C-24, No. 6, pp. 616-628, Jun. 1975, 13 pages.

Freeman, W. et al., "The Design and Use of Steerable Filters," IEEE Transactions on Pattern Analysis and Machine Intelligence, vol. 13, No. 9, pp. 891-906, Sep. 1991, 16 pages.

Geurts, P. et al., "Extremely Randomized Trees," Machine Learning, vol. 63, No. 1, pp. 3-42, Apr. 2006, 40 pages.

Hidayat, R. et al., "Real-Time Texture Boundary Detection from Ridges in the Standard Deviation Space," Proceedings of the British Machine Vision Conference, pp. 1-10, Sep. 2009, 10 pages.

Ho, T. et al., "The Random Subspace Method for Constructing Decision Forests," IEEE Transactions on Pattern Analysis and Machine Intelligence, vol. 20, No. 8, pp. 832-844, Aug. 1998, 13 pages.

Jolliffe, I. T., "Principal Component Analysis," Springer Series in Statistics, 2nd Edition, Oct. 2002, 519 pages. (submitted in two parts).

Kass, M. et al., "Snakes: Active Contour Models," International Journal of Computer Vision, vol. 1, No. 4, pp. 321-331, Jan. 1988, 11 pages.

Kontschieder, P. et al., "Structured Class-Labels in Random Forests for Semantic Image Labelling," Proceedings of IEEE International Conference on Computer Vision, pp. 2190-2197, Nov. 2011, 8 pages.

Lim, J. et al., "Sketch Tokens: A Learned Mid-Level Representation for Contour and Object Detection," Proceedings of IEEE Conference on Computer Vision and Pattern Recognition, pp. 3158-3165, Jun. 2013, 8 pages.

Mairal, J. et al., "Discriminative Sparse Image Models for Class-Specific Edge Detection and Image Interpretation," Proceedings of the 10th European Conference on Computer Vision, pp. 43-56, Oct. 2008, 14 pages.

Malik, J. et al., "Contour and Texture Analysis for Image Segmentation," International Journal of Computer Vision, vol. 43, No. 1, pp. 7-27, Jun. 2001, 21 pages.

Martin, D. et al., "Learning to Detect Natural Image Boundaries using Local Brightness, Color, and Texture Cues," IEEE Transactions on Pattern Analysis and Machine Intelligence, vol. 26, No. 5, pp. 530-549, May 2004, 20 pages.

Martin, D. et al., "A Database of Human Segmented Natural Images and its Application to Evaluating Segmentation Algorithms and Measuring Ecological Statistics," Proceedings of Eighth IEEE International Conference on Computer Vision, vol. 2, pp. 416-423, Jul. 2001, 11 pages.

Nowozin, S. et al., "Structured Learning and Prediction in Computer Vision," Foundations and Trends® in Computer Graphics and Vision, vol. 6, No. 3-4, pp. 185-365, May 2011, 178 pages. (submitted in two parts).

Perona, P. et al., "Scale-Space and Edge Detection using Anisotropic Diffusion," IEEE Transactions on Pattern Analysis and Machine Intelligence, vol. 12, No. 7, pp. 629-639, Jul. 1990, 11 pages.

Ren, X., "Multi-Scale Improves Boundary Detection in Natural Images," Proceedings of the 10th European Conference on Computer Vision, Part III, pp. 553-545, Oct. 2008, 13 pages.

Ren, X. et al., "Scale-Invariant Contour Completion using Conditional Random Fields," Proceedings of the Tenth IEEE International Conference on Computer Vision, vol. 2, pp. 1214-1221, Oct. 2005, 8 pages.

Ren, X. et al., "Figure/Ground Assignment in Natural Images," Proceedings of the 9th European Conference on Computer Vision, Part II, pp. 614-627, May 2006, 14 pages.

Ren, X. et al., "Discriminatively Trained Sparse Code Gradients for Contour Detection," Proceedings of 26th Annual Conference on Neural Information Processing Systems, Dec. 2012, 9 pages.

(56) References Cited

OTHER PUBLICATIONS

Silberman, N. et al., "Indoor Scene Segmentation using a Structured Light Sensor," IEEE International Conference on Computer Vision Workshops, pp. 601-608, Nov. 2011, 8 pages.

Taskar, B. et al., "Learning Structured Prediction Models: a Large Margin Approach," Proceedings of the 22nd International Conference on Machine Learning, pp. 896-903, Aug. 2005, 8 pages.

Tsochantaridis, I. et al., "Support Vector Machine Learning for Interdependent and Structured Output Spaces," Proceedings of the 21st International Conference on Machine Learning, Jul. 2004, 8 pages.

Ullman, S. et al., "Recognition by Linear Combinations of Models," IEEE Transactions on Pattern Analysis and Machine Intelligence, vol. 13, No. 10, pp. 992-1006, Oct. 1991, 15 pages.

Zheng, S. et al., "Detecting Object Boundaries Using Low-, Mid-, and High-level Information," Proceedings of IEEE Conference on Computer Vision and Pattern Recognition, pp. 1-8, Jun. 2007, 8 pages.

Ziou, D. et al., "Edge Detection Techniques-an Overview", International Journal of Pattern Recognition and Image Analysis, vol. 8, pp. 537-559, Dec. 1998, 41 pages.

Dollar, P. et al., "Learned Mid-level Representation for Contour and Object Detection," U.S. Appl. No. 13/794,857, filed Mar. 12, 2013, 32 pages.

Dollar, P. et al., "Structured Forest for Fast Edge Detection," Video of Presentation from Proceedings of ICCV 2013, http://techtalks.tv/talks/structured-forest-for-fast-edge-detection/59412/, Dec. 2013, 31 pages.

Breiman, F. et al., "Classification and Regression Trees," Wadsworth Statistics/Probability Series, pp. 18-92, Jan. 1984, 40 pages.

Duda, R. et al., "Pattern Classification and Scene Analysis," Wiley-Interscience Publication, pp. 1-43, Feb. 1973, 24 pages.

Robinson, G., "Color Edge Detection," Optical Engineering, vol. 16, No. 5, pp. 479-484, Sep./Oct. 1977, 6 pages.

\* cited by examiner

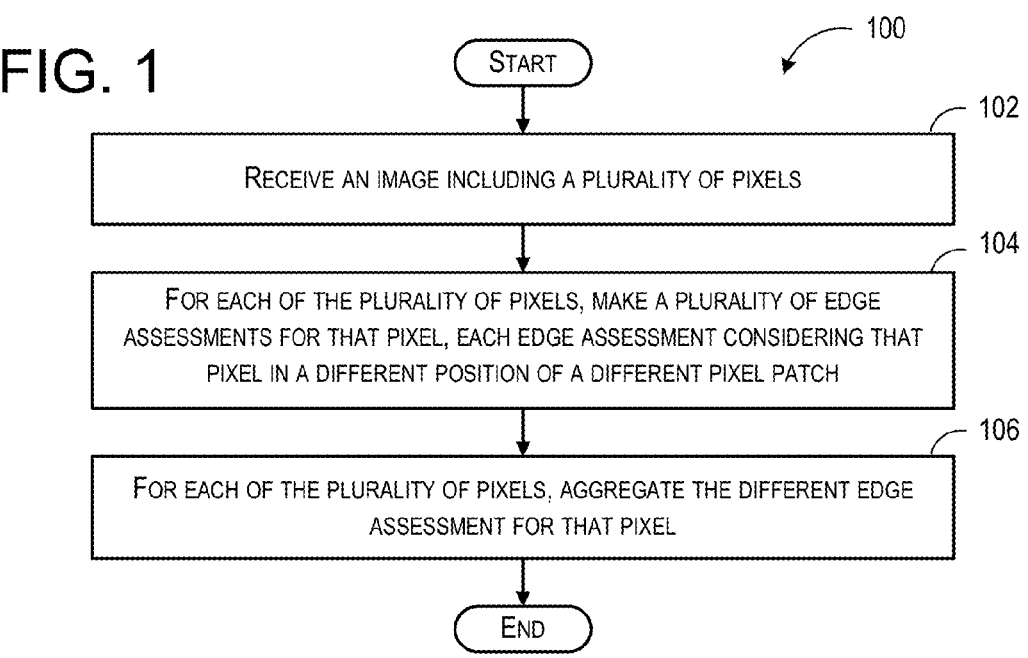

DIGITAL IMAGE EDGE DETECTION

CROSS-REFERENCE TO RELATED APPLICATIONS

This application claims priority to U.S. Provisional Application No. 61/928,944, filed Jan. 17, 2014 and entitled "STRUCTURED FORESTS FOR FAST EDGE DETECTION", the complete contents of which are hereby incorporated herein by reference for all purposes.

BACKGROUND

Edge detection has remained a fundamental task in computer vision since the early 1970's. The detection of edges is a critical preprocessing step for a variety of tasks, including object recognition, segmentation, and active contours. Traditional approaches to edge detection use a variety of methods for computing color gradient magnitudes followed by non-maximal suppression. Unfortunately, many visually salient edges do not correspond to color gradients, such as texture edges and illusory contours. State-of-the-art approaches to edge detection use a variety of features as input, including brightness, color and texture gradients computed over multiple scales. For top accuracy, globalization based on spectral clustering may also be performed.

Since visually salient edges correspond to a variety of visual phenomena, finding a unified approach to edge detection is difficult. Motivated by this observation, the use of learning techniques for edge detection has been explored through a number of approaches. Each of these approaches takes an image patch and computes the likelihood that only the center pixel contains an edge. One independent edge prediction for each pixel may then be combined with the one independent edge prediction for each other pixel using global reasoning.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to one embodiment of the present disclosure, edges may be detected in a digital image including a plurality of pixels. For each of the plurality of pixels, a plurality of different edge assessments are made for that pixel. Each different edge assessment considers that pixel in a different position of a different pixel patch. The different edge assessments for each pixel are aggregated.

BRIEF DESCRIPTION OF THE DRAWINGS

FIG. 1 shows an example method for detecting edges in a digital image.

DETAILED DESCRIPTION

The present disclosure is directed to using a structured learning approach to detect edges in digital images. This approach takes advantage of the inherent structure in edge patches, while being computationally efficient. Using this approach, edge maps may be computed in realtime, which is believed to be orders of magnitude faster than competing state-of-the-art approaches. A random forest framework is used to capture the structured information. The problem of edge detection is formulated as predicting local segmentation masks given input image patches. This approach to learning decision trees uses structured labels to determine the splitting function at each branch in a decision tree. The structured labels are robustly mapped to a discrete space on which standard information gain measures may be evaluated. Each forest predicts a patch of edge pixel labels that are aggregated across the image to compute the final edge map.

FIG. 1 schematically shows an example method 100 for detecting edges. At 102, method 100 includes receiving an image including a plurality of pixels. The received image may be virtually any resolution and/or type of digital image. Further, the received image may be a frame of video. Each pixel of the image may have one or more information channels. As a nonlimiting example, each pixel can have a red color channel, a green color channel, and a blue color channel. As another example, each pixel may include a grayscale channel. As yet another example, each pixel may include a brightness channel and/or a spatial depth channel.

At 104, method 100 includes, for each of the plurality of pixels, making a plurality of different edge assessments for that pixel. Different edge assessments may consider each particular pixel in a different position of a different pixel patch.

Figure 2A:
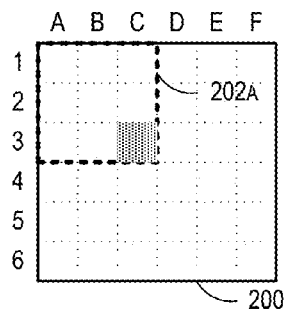
FIGS. 2A-2I show simplified examples of making edge detection assessments using different pixel patches.
Figure 2B:
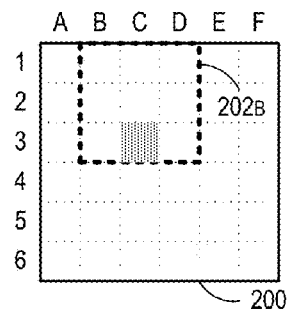
Figure 2C:
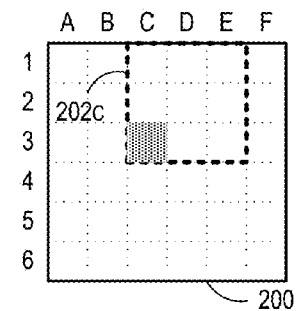
Figure 2D:
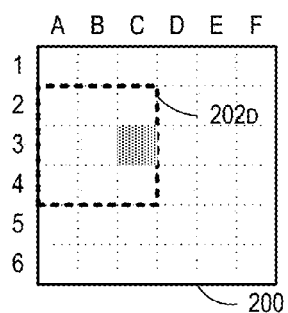
Figure 2E:
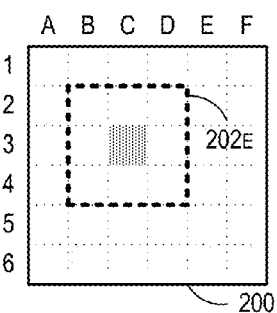
Figure 2F:
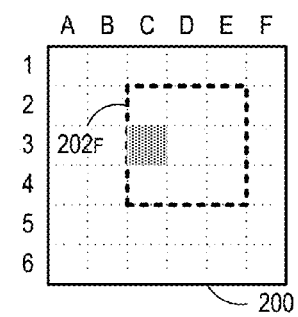
Figure 2G:
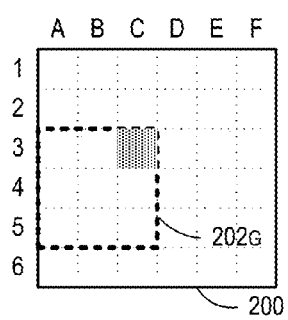
Figure 2H:
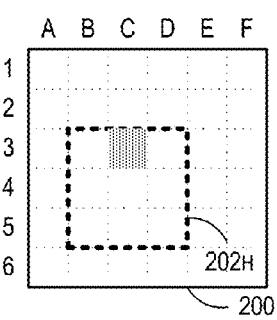
Figure 2I:
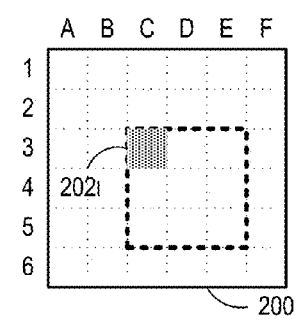

For example, FIGS. 2A-2I schematically show the same portion 200 of an example digital image. FIG. 2A further shows a 3×3 pixel patch 202A, FIG. 2B shows a 3×3 pixel patch 202B, FIG. 2C shows a 3×3 pixel patch 202C, FIG. 2D shows a 3×3 pixel patch 202D, FIG. 2E shows a 3×3 pixel patch 202E, FIG. 2F shows a 3×3 pixel patch 202F, FIG. 2G shows a 3×3 pixel patch 202G, FIG. 2H shows a 3×3 pixel patch 202H, and FIG. 2I shows a 3×3 pixel patch 202I.

As described in detail below, an edge assessment can be made for each pixel in a particular patch. For example, pixel patch 202A from FIG. 2A may assess pixels A1, A2, A3, B1, B2, B3, C1, C2, and C3; and pixel patch 202I from FIG. 2I may assess pixels C3, C4, C5, D3, D4, D5, E3, E4, and E5.

Furthermore, each pixel may be assessed while that pixel occupies a different relative position in a pixel patch. For example, pixel C3 is considered in the lower right of pixel patch 202A, the lower middle of pixel patch 202B, the lower left of pixel patch 202C, the middle right of pixel patch 202D, the center of pixel patch 202E, the middle left of pixel patch 202F, the upper right of pixel patch 202G, the upper middle of pixel patch 202H, and the upper left of pixel patch 202I.

In the above example, the pixel patches are 3×3 squares, but that is in no way limiting. Pixel patches of any size and/or shape may be used, including pixel patches of non-square or even non-rectangular geometries.

Each different edge assessment may use a decision tree or a decision forest on a respective pixel patch. Each decision tree used in such an assessment may be previously trained via supervised machine learning as discussed below.

The same decision tree or forest of decision trees may be used on each pixel patch, or different decision trees or forests may be used for different pixel patches. When different decision trees or forests are used for different pixel patches, a set of decision trees or forests may be used in a repeating pattern. For example, a first decision tree could be used on pixel patches 202A, 202D, and 202G; a second decision tree could be used on pixel patches 202B, 202E, and 202H; and a third decision tree could be used on pixel patches 202C, 202F, and 202I. While a simple every-third repeating pattern is provided in the above example, any pattern can be used. As another example, the same structured forest may be periodically used for different pixel patches (e.g., every other patch, every-third patch, every-fourth patch, etc.).

When structured forests are used, each structured forest may utilize four or fewer decision trees. As one example, it is believed that using structured forests with two, three, or four decision trees efficiently produces good edge detection results. However, forests including more trees may be used.

Returning to FIG. 1, at 106, method 100 further includes, for each of the plurality of pixels, aggregating the different edge assessments for that pixel. Using the example of FIGS. 2A-2I, pixel C3 has been assessed in different positions of nine different pixel patches. The results from each such assessment may be aggregated into a final determination for that pixel.

In some implementations, the individual assessments may yield a binary output (e.g., edge=1; or not edge=0). These binary outputs may be averaged. As an example, if three assessments yield an edge (i.e., 1) and one assessment yields a not edge (i.e., 0), the average is (1+1+1+0)/4=0.75. In other implementations, each assessment optionally may be associated with a confidence or weighting. For example, the assessment from pixel patch 202E optionally may be weighted higher than the other assessments because pixel C3 is in the center of pixel patch 202E. As another example, the assessment from pixel patch 202C optionally may be discarded because the assessment of pixel patch 202C yielded a low confidence.

The final determinations for the different pixels may be formulated into an edge map. An edge map may include, for each pixel, an information channel that indicates whether that pixel is an edge pixel or a non-edge pixel and/or a confidence in the determination.

Figure 3:
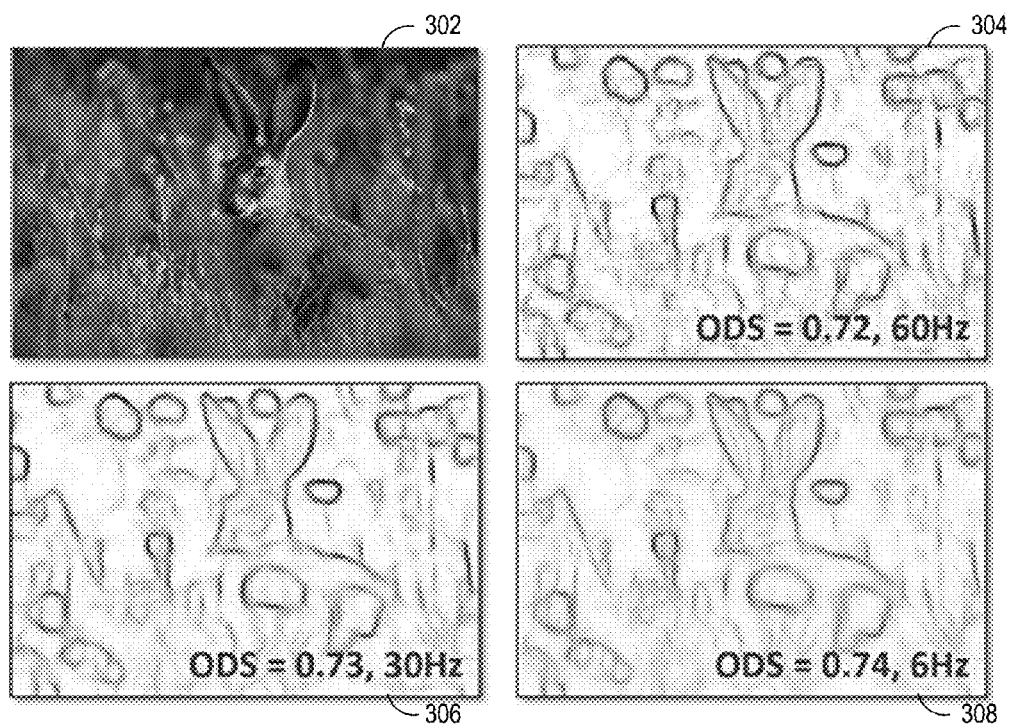
FIG. 3 shows an example digital image and example edge maps corresponding to three different versions of an exemplary edge detection approach.

FIG. 3 shows an example digital image 302, and example edge maps corresponding to three different versions of the edge detection approach disclosed herein. Edge map 304 corresponds to a single scale approach in which one decision tree is used for each pixel patch. Edge map 306 corresponds to a single scale approach in which four decision trees are used for each pixel patch. Edge map 308 corresponds to a multiscale approach in which four trees are used for each pixel patch.

The approach set forth above with reference to FIGS. 1-3 is described in more detail below.

A decision tree $f_t(x)$ classifies a sample $x \in X$ by recursively branching left or right down the tree until a leaf node is reached. Specifically, each node j in the tree is associated with a binary split function:

$$h(x, \theta_j) \in \{0, 1\} \tag{1}$$

with parameters $\theta_j$. If $h(x, \theta_j)=0$ node j sends x left, otherwise right, with the process terminating at a leaf node. The output of the tree on an input x is the prediction stored at the leaf reached by x, which may be a target label $y \in Y$ or a distribution over the labels Y.

While the split function $h(x, \theta)$ may be arbitrarily complex, a single feature dimension of x may be compared to a threshold. Specifically, $\theta=(k, \tau)$ and $h(x, \theta)=[x(k)<\tau]$, where [•] denotes the indicator function. As another example, $\theta=(k_1, k_2, \tau)$ and $h(x, \theta)=[x(k_1)-x(k_2)<\tau]$ may be used. The above both may be computationally efficient and effective in practice.

A decision forest is an ensemble of T independent trees $f_t$. Given a sample x, the predictions $f_t(x)$ from the set of trees are combined using an ensemble model into a single output. Choice of ensemble model is problem specific and depends on Y. As one example, majority voting may be used for classification and averaging may be used for regression, although more sophisticated ensemble models may be employed.

Arbitrary information may be stored at the leaves of a decision tree. The leaf node reached by the tree depends only on the input x, and while predictions of multiple trees must be merged in some useful way (the ensemble model), any type of output y can be stored at each leaf. This allows use of complex output spaces Y, including structured outputs.

While prediction is straightforward, training random decision forests with structured Y can be more challenging.

Each tree may be trained independently in a recursive manner. For a given node j and training set $S_j \subset X \times Y$, the goal is to find parameters $\theta_j$ of the split function $h(x, \theta_j)$ that result in a 'good' split of the data. This requires defining an information gain criterion of the form:

$$I_j = I(S_j, S_j^L, S_j^R) \tag{2}$$

where $S_j^L = \{(x, y) \in S_j | h(x, \theta_j) = 0\}$, $S_j^R = S_j \setminus S_j^L$. Splitting parameters $\theta_j$ may be chosen to maximize the information gain $I_j$; training then proceeds recursively on the left node with data $S_j^L$ and similarly for the right node. Training stops when a maximum depth is reached or if information gain or training set size fall below fixed thresholds.

For multiclass classification ($Y \subset \mathbb{Z}$) the definition of information gain can be used:

$$I_j = H(S_j) - \sum_{k \in \{L, R\}} \frac{|S_j^k|}{|S_j|} H(S_j^k) \tag{3}$$

where $H(S) = -\Sigma_y p_y \log(p_y)$ denotes the Shannon entropy and $p_y$ is the fraction of elements in S with label y. Alternatively the Gini impurity $H(S) = \Sigma_y p_y (1-p_y)$ has also been used in conjunction with Eqn. (3).

For regression, entropy and information gain can be extended to continuous variables. Alternatively, an approach for single-variate regression (Y=R) is to minimize the variance of labels at the leaves. If the variance is written as $$H(S) = \frac{1}{|S|} \sum_y (y - \mu)^2 \text{ where } \mu = \frac{1}{|S|} \sum_y y,$$

then substituting H for entropy in Eqn. (3) leads to the standard criterion for single-variate regression.

A more general information gain criterion may be defined for Eqn. (2) that applies to arbitrary output spaces Y, given mild additional assumptions about Y.

Individual decision trees exhibit high variance and tend to overfit. Decision forests ameliorate this by training multiple de-correlated trees and combining their output. A component of the training procedure is therefore to achieve a sufficient diversity of trees.

Diversity of trees can be obtained either by randomly subsampling the data used to train each tree or randomly subsampling the features and splits used to train each node. Injecting randomness at the level of nodes tends to produce higher accuracy models. Specifically, when optimizing Eqn. (2), only a small set of possible $\theta_j$ are sampled and tested when choosing the optimal split. E.g., for stumps where $\theta=(k, \tau)$ and $h(x, \theta)=[x(k)<\tau]$, $\sqrt{d}$ a features may be sampled, where $X=R^d$ and a single threshold $\tau$ per feature.

In effect, accuracy of individual trees may be sacrificed in favor of a high diversity ensemble. Leveraging similar intuition allows for the introduction of an approximate information gain criterion for structured labels and leads to the generalized structured forest formulation.

Random decision forests may be extended to general structured output spaces Y. Of particular interest for computer vision is the case where $x \in X$ represents an image patch and $y \in Y$ encodes the corresponding local image annotation (e.g., a segmentation mask or set of semantic image labels).

Training random forests with structured labels poses two main challenges. First, structured output spaces are often high dimensional and complex. Thus scoring numerous candidate splits directly over structured labels may be prohibitively expensive. Second, and more critically, information gain over structured labels may not be well defined.

However, even approximate measures of information gain may suffice to train effective random forest classifiers. 'Optimal' splits are not necessary or even desired, All the structured labels $y \in Y$ may be mapped at a given node into a discrete set of labels $c \in C$, where $C=\{1, \ldots, k\}$, such that similar structured labels y are assigned to the same discrete label c.

Given the discrete labels C, information gain calculated directly and efficiently over C can serve as a proxy for the information gain over the structured labels Y. By mapping the structured labels to discrete labels prior to training each node, the existing random forest training procedures may be leveraged to learn structured random forests effectively.

The present approach to calculating information gain may measure similarity over Y. However, for many structured output spaces, including those used for edge detection, computing similarity over Y is not well defined. Instead, a mapping of Y to an intermediate space Z is defined in which distance is easily measured. Therefore, a two-stage approach may be utilized to first map $Y \to Z$ and then to map $Z \to C$.

The assumption is that for many structured output spaces, including for structured learning of edge detection, a mapping of the form may be defined:

$$\Pi: Y \to Z \quad (4)$$

such that the dissimilarity of $y \in Y$ can be approximated by computing Euclidean distance in Z. For example, for edge detection the labels $y \in Y$ may be 16×16 segmentation masks and $z=\Pi(y)$ may be defined to be a long binary vector that encodes whether every pair of pixels in y belong to the same or different segments. Distance may be measured in the resulting space Z.

Z may be high dimensional which presents a challenge computationally. For example, for edge detection there are $$\binom{16 \cdot 16}{2} = 32640$$

unique pixel pairs in a 16×16 segmentation mask, so computing z for every y would be expensive. However, as only an approximate distance measure is necessary, the dimensionality of Z can be reduced.

In order to reduce dimensionality, m dimensions of Z are sampled, resulting in a reduced mapping $\Pi_\varphi: Y \to Z$ parameterized by $\varphi$. During training, a distinct mapping $\Pi_\varphi$ may be randomly generated and applied to training labels $Y^j$ at each node j. This serves two purposes. First, $\Pi_\varphi$ can be considerably faster to compute than $\Pi$. Second, sampling Z injects additional randomness into the learning process and helps ensure a sufficient diversity of trees.

Finally, Principal Component Analysis (PCA) can be used to further reduce the dimensionality of Z. PCA denoises Z while approximately preserving Euclidean distance. In practice, $\Pi_\varphi$ may be used with m=256 dimensions followed by a PCA projection to at most 5 dimensions.

Given the mapping $\Pi_\varphi: Y \to Z$, a number of choices for the information gain criterion are possible. For discrete Z multivariate joint entropy could be computed directly. However, due to complexity of $O(|Z|^m)$, only $m \leq 2$ could be used. However, $m \geq 64$ may be necessary to accurately capture similarities between elements in Z. Alternatively, given continuous Z, variance or a continuous formulation of entropy can be used to define information gain. Instead of the above, a simpler, extremely efficient approach may be used.

A set of structured labels $y \in Y$ may mapped into a discrete set of labels $c \in C$, where $C=\{1, \ldots, k\}$, such that labels with similar z are assigned to the same discrete label c. The discrete labels may be binary (k=2) or multiclass (k>2). This allows for the use of standard information gain criteria based on Shannon entropy or Gini impurity as defined in Eqn. (3). Discretization may be performed independently when training each node and may depend on the distribution of labels at a given node.

The following are two approaches for obtaining the discrete label set C given Z. The first approach is to cluster z into k clusters using K-means. Alternatively, z may be quantized based on the top $\log_2(k)$ PCA dimensions, assigning z a discrete label c according to the orthant (generalization of quadrant) into which z falls. Both approaches perform similarly but the latter may be slightly faster. PCA quantization with k=2 may be used.

Finally, a set of n labels $y_1 \ldots y_n \in Y$ may be combined into a single prediction both for training (to associate labels with nodes) and testing (to merge multiple predictions). As before, an m dimensional mapping $\Pi_\varphi$ may be sampled and $z_i=\Pi_\varphi(y_i)$ may be computed for each i. The label $y_k$ may be selected whose $z_k$ is the medoid, i.e. the $z_k$ that minimizes the sum of distances to all other $z_i$. The medoid $z_k$ minimizes $\Sigma_{ij}(z_{kj}-z_{ij})^2$. This is equivalent to $\min_k \Sigma_j(z_{kj}-\bar{z}_j)^2$ and can be computed efficiently in time O(nm).

The ensemble model depends on m and the selected mapping $\Pi_\varphi$. However, only the medoid for small n needs to be computed (either for training a leaf node or merging the output of multiple trees), so having a coarse distance metric suffices to select a representative element $y_k$.

The biggest limitation is that any prediction $y \in Y$ must have been observed during training; the ensemble model is unable to synthesize novel labels. Indeed, this is impossible without additional information about Y. In practice, domain specific ensemble models can be preferable. For example, in edge detection, the default ensemble model is used during training but a custom approach is utilized for merging outputs over multiple overlapping image patches.

According to the present disclosure, each pixel of an image (that may contain multiple channels, such as an RGB or RGBD image) may be labeled with a binary variable indicating whether the pixel contains an edge or not. Similar to the task of semantic image labeling, the labels within a small image patch are highly interdependent.

A set of segmented training images may be given, in which the boundaries between the segments correspond to contours. Given an image patch, its annotation can be specified either as a segmentation mask indicating segment membership for each pixel (defined up to a permutation) or a binary edge map. $y \in Y = \mathbb{Z}^{d \times d}$ is used to denote the former and $y' \in Y' = \{0,1\}^{d \times d}$ for the latter, where d indicates patch width. An edge map y' can be derived from segmentation mask y, but not vice versa. Both representations are used in this approach.

The learning approach may predict, for example, a structured 16×16 segmentation mask from a larger 32×32 image patch. Each image patch may be augmented with multiple additional channels of information, resulting in a feature vector $x \in R^{32 \times 32 \times K}$ where K is the number of channels. Features of two types may be used: pixel lookups $x(i, j, k)$ and pairwise differences $x(i_1, j_1, k) - x(i_2, j_2, k)$.

A set of color and gradient channels (e.g., a set developed for fast pedestrian detection) may be used. 3 color channels may be computed in CIE-LUV color space along with normalized gradient magnitude at 2 scales (original and half resolution). Additionally, each gradient magnitude channel may be split into 4 channels based on orientation. The channels may be blurred, for example, with a triangle filter of radius 2 and downsampled by a factor of 2. The result is 3 color, 2 magnitude and 8 orientation channels, for a total of 13 channels.

The channels may be downsampled by a factor of 2, resulting in 32·32·13/4=3328 candidate features $x(i, j, k)$. The difference features also may be computed pairwise. A large triangle blur may be applied to each channel (8 pixel radius), and downsampled to a resolution of 5×5. Sampling all candidate pairs and computing their differences yields an additional $$\binom{5 \cdot 5}{2} = 300$$

candidate features per channel, resulting in 7228 total candidate features per patch.

A definition for mapping $\Pi: Y \rightarrow Z$ may be used to train decision trees. The structured labels y may be 16×16 segmentation masks. One option is to use $\Pi: Y \rightarrow Y'$, where y' represents the binary edge map corresponding to y. However, Euclidean distance over Y' yields a brittle distance measure.

An alternate mapping $\Pi$ can be used. Let $y(j)$ for $1 \leq j \leq 256$ denote the $j^{th}$ pixel of mask y. Since y is defined only up to a permutation, a single value $y(j)$ yields no information about y. Instead, a pair of locations are sampled $j_1 \neq j_2$ and checked to determine if $y(j_1) = y(j_2)$. As such, $z = \Pi(y)$ as a large binary vector that encodes $[y(j_1) = y(j_2)]$ for every unique pair of indices $j_1 \neq j_2$. While Z has $$\binom{256}{2}$$

dimensions, in practice only a subset of m dimensions need be computed. A setting of m=256 and k=2 is thought to give good results, effectively capturing the similarity of segmentation masks.

Random forests may achieve robust results by combining the output of multiple decorrelated trees. While merging multiple segmentation masks $y \in Y$ can be difficult, multiple edge maps $y' \in Y'$ can be averaged to yield a soft edge response. Taking advantage of a decision tree's ability to store arbitrary information at the leaf nodes, in addition to the learned segmentation mask y, the corresponding edge map y' is also stored. This allows the predictions of multiple trees to be combined through averaging.

The efficiency of the present approach derives from the use of structured labels that capture information for an entire image neighborhood, reducing the number of decision trees T that need to be evaluated per pixel. The structured output may be computed densely on the image with a stride of, for example, 2 pixels. With 16×16 output patches, each pixel would receive $16^2 T/4 \approx 64T$ predictions. In practice, $1 \leq T \leq 4$ may be used.

It may be assumed that predictions are uncorrelated. Since both the inputs and outputs of each tree overlap, 2T total trees may be trained and an alternating set of T trees may be evaluated at each adjacent location. Use of such a 'checkerboard pattern' can improve results, introducing larger separation between the trees did not improve results further.

A multiscale version of the edge detector may be implemented. Given an input image I, the structured edge detector may be run on the original, half, and double resolution version of I. The result of the three edge maps may be averaged after resizing to the original image dimensions. Although less efficient, this approach may improve edge quality.

Figure 4:
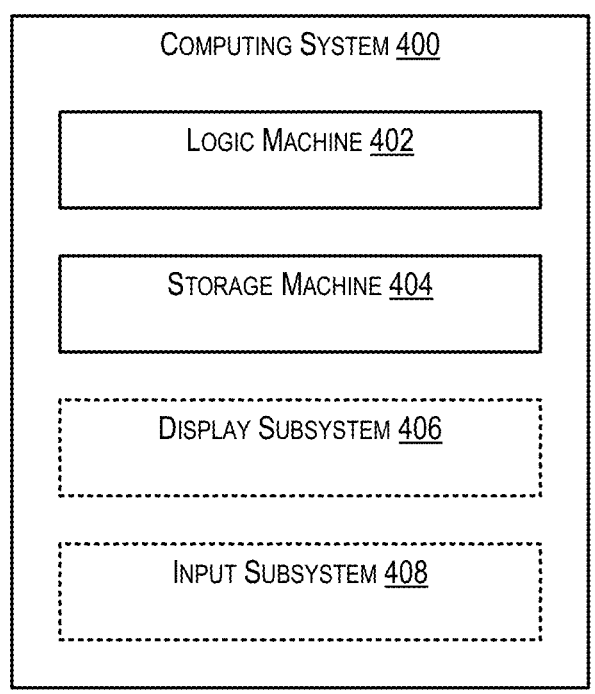
FIG. 4 shows an example edge-detecting computing system.

FIG. 4 schematically shows a non-limiting embodiment of an edge-detecting computing system 400 that can enact one or more of the methods and processes described above. Computing system 400 is shown in simplified form. Computing system 400 may take the form of one or more personal computers, server computers, tablet computers, home-entertainment computers, network computing devices, gaming devices, mobile computing devices, mobile communication devices (e.g., smart phone), and/or other computing devices.

Computing system 400 includes a logic machine 402 and a storage machine 404. Computing system 400 may optionally include a display subsystem 406, input subsystem 408, and/or other components not shown in FIG. 4.

Logic machine 402 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 404 includes one or more physical devices configured to hold instructions executable by the logic machine to implement the methods and processes described herein. When such methods and processes are implemented, the state of storage machine 404 may be transformed—e.g., to hold different data.

Storage machine 404 may include removable and/or built-in devices. Storage machine 404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 404 may include volatile, nonvolatile, dynamic, static, read/write, read-only, random-access, sequential-access, location-addressable, file-addressable, and/or content-addressable devices.

It will be appreciated that storage machine 404 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 402 and storage machine 404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 406 may be used to present a visual representation of data held by storage machine 404. This visual representation may take the form of a graphical user interface (GUI). As the herein described methods and processes change the data held by the storage machine, and thus transform the state of the storage machine, the state of display subsystem 406 may likewise be transformed to visually represent changes in the underlying data. Display subsystem 406 may include one or more display devices utilizing virtually any type of technology. Such display devices may be combined with logic machine 402 and/or storage machine 404 in a shared enclosure, or such display devices may be peripheral display devices.

When included, input subsystem 408 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An image editing computer, comprising:
   a logic machine; and
   a storage machine holding instructions executable by the logic machine to:
     receive an image including a plurality of pixels;
     construct a plurality of different pixel patches for one or more particular pixels of the plurality of pixels, each different pixel patch including a plurality of pixel positions, such that the particular pixel is located at each of the plurality of pixel positions in the plurality of different pixel patches;
     perform one or more edge assessments for each pixel patch;
     aggregate the different edge assessments for the particular pixel into a digital image edge map including an information channel that indicates whether the particular pixel is an edge pixel or a non-edge pixel; and
     store the digital image edge map.

2. The image editing computer of claim 1, wherein each different edge assessment uses a decision tree on a pixel patch.

3. The image editing computer of claim 2, wherein a set of decision trees are used on the different pixel patches in a repeating pattern.

4. The image editing computer of claim 2, wherein the decision tree is previously trained via supervised machine learning.

5. The image editing computer of claim 1, wherein each different edge assessment uses a structured forest on a pixel patch, the structured forest using one or more decision trees on the pixel patch.

6. The image editing computer of claim 5, wherein the structured forest analysis uses four or fewer decision tress.

7. The image editing computer of claim 5, wherein different structured forests are used on different pixel patches.

8. The image editing computer of claim 7, wherein a same structured forest is periodically used for different pixel patches.

9. The image editing computer of claim 5, wherein a set of the different structured forests are used on the different pixel patches in a repeating pattern.

10. A method of detecting edges, comprising:
    receiving an image including a plurality of pixels;
    constructing a plurality of different pixel patches for one or more particular pixels of the plurality of pixels, each different pixel patch including a plurality of pixel positions, such that the particular pixel is located at each of the plurality of pixel positions in the plurality of different pixel patches;
    performing one or more computer-implemented edge assessments for each pixel patch, each different computer-implemented edge assessment utilizing a computer-implemented structured forest including two or more decision trees, wherein different computer-implemented structured forests are used on different pixel patches;

aggregating the different computer-implemented edge assessments for the particular pixel into a digital image edge map including an information channel that indicates whether the particular pixel is an edge pixel or a non-edge pixel; and storing the digital image edge map.

11. The method of claim 10, wherein a same computer-implemented structured forest is periodically used for different pixel patches.

12. The method of claim 10, wherein a set of the different computer-implemented structured forests are used on the different pixel patches in a repeating pattern.

13. The method of claim 10, wherein each decision tree is previously trained via supervised machine learning.

14. A method of detecting edges, comprising:

receiving an image including a plurality of pixels;

constructing a plurality of different pixel patches for one or more particular pixels of the plurality of pixels, each different pixel patch including a plurality of pixel positions, such that the particular pixel is located at each of the plurality of pixel positions in the plurality of different pixel patches;

performing one or more computer-implemented edge assessments for each pixel patch, each different computer-implemented edge assessment utilizing a computer-implemented structured forest including two to four decision trees;

aggregating the different computer-implemented edge assessments for the particular pixel into a digital image edge map including an information channel that indicates whether the particular pixel is an edge pixel or a non-edge pixel; and storing the digital image edge map.

15. The method of claim 14, wherein each different decision tree is previously trained via supervised machine learning.

16. The method of claim 14, wherein different computer-implemented structured forests are used on different pixel patches.

17. The method of claim 16, wherein a same computer-implemented structured forest is periodically used for different pixel patches.

18. The method of claim 16, wherein a set of the different computer-implemented structured forests are used on the different pixel patches in a repeating pattern.

19. The image editing computer of claim 1, wherein the instructions are executable by the logic machine to display the digital image edge map.

20. The image editing computer of claim 1, where the instructions are further executable to construct a plurality of different pixel patches for each pixel of the plurality of pixels, perform one or more edge assessments for each pixel patch, and aggregate the different edge assessments into the digital image edge map.

* * * * *